United States Patent [19]

Novich et al.

[11] Patent Number: 4,882,304

[45] Date of Patent: Nov. 21, 1989

[54] LIQUIFICATION OF HIGHLY LOADED COMPOSITE SYSTEMS

[75] Inventors: Bruce E. Novich, Lexington; John W. Halloran, Hopkinton, both of Mass.

[73] Assignee: Ceramics Process Systems Corp., Milford, Mass.

[21] Appl. No.: 36,377

[22] Filed: Apr. 9, 1987

Related U.S. Application Data

[63] Continuation-in-part of Ser. No. 856,803, Apr. 25, 1986, Pat. No. 4,816,182.

[51] Int. Cl.$^4$ .......................... B01F 3/12; B01F 17/00; B22F 3/22; C04B 33/28

[52] U.S. Cl. ................................. 501/32; 252/313.1; 252/313.2; 252/306; 501/1; 501/87; 501/88; 501/95; 501/97; 501/103; 501/127; 501/152; 501/153; 264/86; 264/302; 264/56; 264/63; 264/DIG. 36

[58] Field of Search ........................... 252/313.1, 313.2; 501/1, 88, 95, 97, 103, 127, 152, 153, 32, 87

[56] References Cited

U.S. PATENT DOCUMENTS

| | | | |
|---|---|---|---|
| 3,758,317 | 9/1973 | Moore et al. | 501/128 X |
| 4,221,697 | 9/1980 | Osborn et al. | 252/183.11 X |
| 4,318,995 | 3/1982 | Rhodes et al. | 501/1 |
| 4,463,058 | 7/1984 | Hood et al. | 501/88 X |
| 4,569,920 | 2/1986 | Smith-Johannsen | 501/1 |
| 4,677,082 | 6/1987 | Alford et al. | 501/88 |
| 4,816,182 | 3/1989 | Novich et al. | 252/313.1 |

OTHER PUBLICATIONS

T. Dabak and O. Yucel, "Shear Viscosity Behavior of Highly Concentrated Suspensions at Low and High Shear Rates," *Rheol. Acta.*, 25: 527-533 (1986).

Temple C. Patton, *Paint Flow and Pigment Dispersion*, 2nd Ed. (New York: John Wiley & Sons, 1979), Chapt. 16.

G. W. Phelps and M. G. McLaren, "Particle Size Distribution and Slip Properties," *Ceramics Processing Before Firing*, Ed. by Onoda, Jr., and Hench (New York: John Wiley & Sons, 1978).

John V. Milewski, "Efficient Use of Whiskers in the Reinforcement of Ceramics," *Advanced Ceramic Materials*, vol. 1, No. 1, pp. 36-41 (1986).

F. Takao, W. R. Cannon and S. C. Danforth, "Nonaqueous Colloidal Processing of Reaction-Bonded Silicon Nitride-SiC Whisker Composites," Advances in Ceramics, vol. 21: Ceramic Powder Science (American Ceramic Soc. 1987).

Primary Examiner—Brooks H. Hunt
Assistant Examiner—Virginia B. Caress
Attorney, Agent, or Firm—Bradley N. Ruben

[57] ABSTRACT

A highly loaded, uniform ceramic composite can be made by first preparing a highly loaded suspension. Due to the particle-particle interactions of a highly concentrated system, virtually any dopant can be added, including other suspensions, fibers, and whiskers. The process is particularly useful for making composites of materials which coagulate when mixed at low concentration.

26 Claims, No Drawings

LIQUIFICATION OF HIGHLY LOADED COMPOSITE SYSTEMS

This application is a continuation-in-part of U.S. patent application Ser. No. 856,803, filed Apr. 25, 1986, now U.S. Pat. No. 4,816,182 which is hereby incorporated herein by reference.

DESCRIPTION

This invention relates to a process of mixing multicomponent colloidal materials to form a homogeneous mixture which has a high volume percent solids. It also relates to the compositions produced by the novel process.

BACKGROUND ART

One of the problems limiting the development of high performance ceramic materials is a very basic one, i.e., it is often difficult, if not impossible to mix two or more different particulate materials and obtain a homogenous composite mixture. The differences between particles could be compositional, geometrical, surface chemical, etc. Processing difficulties are exacerbated for fine particles (micron and submicron sized), which are of principal interest in the manufacture of high performance ceramic and metallic parts, formed to net shape. This requires extraordinary particulate and process control, exceeding that which is currently practiced as the state of the art. Effective homogenization and maintenance is particularly difficult for dry mixed fine particulate materials and engineers have turned toward wet methods for success. Matijevic (1986) "Colloidal Science of Composite Systems" in *The Science of Ceramic Chemical Processing* (L. L. Hench, et al., Editors) Wiley Interscience Publ., pg. 463 (1986) discusses the difficulties involved in the wet preparation of fine composite particulate systems and he sites three potential techniques: "(1) homogeneous precipitation from solution of mixed chemical composition, (2) precipitation of solid(s) in a dispersion already containing one or more kinds of performed particles and (3) mixing dispersions of different particles". Wet mixing of dispersions of different particles is state of the art in the coarse particulate industries and is currently being investigated in the fine particle industries. The other two techniques are still in their infancy.

While wet mixing methods have demonstrated that wet processing can yield microscopically homogeneous composites (Carlstrom and Lange, "Mixing of Flocced Suspension" *J. Am. Ceram. Soc.* v67(8): c169–170, 1984; Aksay et al. "Uniformity of $Al_2O_3$–$ZrO_2$ Composites by Colloidal Filtration" *J. Am. Ceram. Soc.* v66(10): c190–193, 1983), wet processing methods have been limited to dilute systems (typically 20–30 volume percent solids). In order to effectively and efficiently carry out the sintering process, it is preferred that the particle packing in the dried, prefered body by appproximately 50 volume percent solids and preferably 60 volume percent solids. To achieve these prefered particle concentrations, the composite suspension must undergo a dewatering-consolidation step, generally known as the forming process. Inherent in the forming process are the establishment of gradients and non-uniformities within the sample as the particles consolidate and the pore fluid is extracted. This can lead to gross particle packing, compositional inhomogeneities and non-controllable drying shrinkage resulting in poor process control and reproducibility. Being able to mix dissimilar materials at high solids loading greatly would reduce the potential for microstructural inhomogeneities and give the process engineer greater control of the net shape forming process. Although this maximum solids fraction can be higher if the particles do not have a narrow size range, narrow sized particles are precursors to uniform ceramics having uniformly reproducible properties, such as drying and firing shrinkage for net shape manufacture, and for high performance applications.

For example, it is difficult to mix partially stabilized colloidal zirconia with colloidal alumina in aqueous suspension. In conventional aqueous colloidal dispersions, the alumina particles (matrix phase) have a negative surface charge. When the partially stabilized zirconia (dopant), which has a positive surface charge, is added, the mixture hetero-coagulates. The use of dispersants helps, but is restricted due to the different surface chemistries of the colloidal phases. The coagulation imposes a rheological limit for the amount of dopant and solids that can be added. Further, due to poor mixing, the resultant mixture is not homogenous.

This problem is not limited to the addition of colloidal suspensions or powders. A growing trend in ceramic engineering is to develop materials with increased fracture toughness by the addition of ceramic fibers. The fiber may be made out of the same material as the matrix, but is often made from a different, stronger material. Fibers improve toughness by preventing tiny cracks which appear in stressed material from developing into large cracks, which ultimately cause the material to shatter. However, to be effective, the fibers should be uniformly distributed throughout the matrix. Similar particle interactions as the ones described above make uniform distribution a difficult task.

The addition of whiskers to a material is another method of imparting greater fracture toughness, stiffness, and tensile strength to ceramic products. Whiskers differ from fibers in that whiskers are mono-crystalline whereas fibers are polycrystalline. Whiskers are much thinner and shorter than fibers. They tend to be stronger than fibers, as well. Like fibers, they need to be uniformly dispersed throughout the ceramic in order to impact optimum properties, but due to particle-particle interactions, this is difficult to achieve.

A higher volume percent of solids would result in less shrinkage upon drying and sintering, superior green strength, and a reduction in the probability of a large defect or void in particle packing. In addition, faster processing results from the reduced volume fraction of liquid.

Accordingly, there exists a need for a composite system for maintaining a maximum solids content of narrow size distribution in suspension, thereby maximizing green strength and minimizing shrinkage, while still maintaining the components in a flowable or pourable state.

DISCLOSURE OF INVENTION

The present invention solves the problems inherent in the prior art by providing a process for producing a high volume percent, uniformly dispersed mixture of two or more materials by first making a high volume percent suspension of the first material (the matrix), then adding the second and subsequent materials (dopants) to the first suspension. This process allows for the creation of mixtures which were quite difficult, if not impossible to create before. Another advantage is the general universality of the procedure. Both aqueous and non-aqueous systems and combinations thereof can be used. Further, the resulting materials have a high solids content with no binder which imparts numerous structural advantages, such as high green strength, effectively no binder burnout, lower firing times, and low, controlled drying and firing shrinkage.

The matrix material can be virtually any material which can be put into a highly loaded suspension. A highly loaded suspension can be produced in accordance with the above application Ser. No. 856,803. The dopant material can be one or more suspension of particulates, whiskers, or fibers. The compositions made from this process have advantages over those made from the laborious techniques of the prior art in that they have a more uniform distribution of dopant material, and may have a higher percentage of dopant material. Further, the composite suspensions can be fabricated from commercially available materials using simple, economical processing steps.

DESCRIPTION OF SPECIFIC EMBODIMENTS

We have discovered a process which overcomes the prior art problem of mixing two or more diverse materials. Using this process, one can choose any matrix phase desired and mix any dopant, apparently regardless of surface chemistry of the particles. The process allows for the creation of novel composite materials as well as for the creation of traditional composites which have superior homogenity.

The first step in the process is the production of a suspension of highly loaded particles (above about 50 volume percent). This can be done by using narrow size range particles. One process for the production of such particles is by a centrifugation technique, detailed in copending Ser. No. 028,891, filed Mar. 28, 1987, now U.S. Pat. No. 4,781,671, incorporated herein by reference. The narrow size range particles are then put into a suspension having a high particle concentration. One method for making such a suspension is detailed in copending patent application Ser. No. 856,803 now U.S. Pat. No. 4,816,182.

Virtually any materials which can be put into a high solids colloidal suspension can be used in this invention. Preferred materials include but are not limited to: alumina, partially stabilized zirconia, silicon carbide, titania, yttria, and silicon nitride. Other materials may include, but are not limited to, magnesium oxide, boron carbide, boron nitride, aluminum nitride, borosilicate glass, and cordierite.

The dopant material may be almost any material desired. Particular suspensions envisioned include: alumina, partially stabilized zirconia, silicon carbide, yttria, silicon nitride and mixtures of these. These may be narrow size range particles of approximately 30 volume percent. An important feature of this invention is that the dopant material is not limited to a second particulate phase. This invention envisions mixtures where the dopant is, or includes, fibers and/or whiskers.

Ceramic fibers may be made from a variety of materials including silicon carbide, graphite, borosilicate, boron nitride, aluminum oxide and aluminum silicate. Fibers are generally at least 10–15 micrometers in diameter, and may range up to several centimeters long.

Whiskers are much smaller than fibers, with diameters that are typically less than 1 micrometer, and lengths ranging from 10–80 micrometers. Whiskers have been made from silicon carbide, silicon nitride, and aluminum oxide. Depending on the application, a preferred final concentration of whiskers may range up to approximately 30 or 40 volume percent. Further, this invention may be used to produce a suspension of one type of particle but wherein the particles have a plurality of size range populations. For example, one could make bi-model suspension of (i) narrow size range alumina particles having an average size of 2 micrometers and (ii) narrow size range alumina particles having an average size of 0.5 micrometers.

It is believed that a wide range of matrix and dopant materials can be combined because chemistry and particle-particle interactions in a highly loaded particulate system are quite different from those occurring in a dilute system. In a dilute system, the oppositely charged particles tend to agglomerate. However, in a concentrated system, the dispersant that is on the particles may act as a lubricant, and as a steric barrier which allows dopants to be dispersed throughout the matrix, rather than hetero-coagulating or homocoagulating.

In essence, by using a highly loaded matrix phase, a very wide range of composite materials can be made. Further, as many additional dopants can be added to the matrix phase as desired. The only limit on the system is that it remain liquid. Generally, we have found that aqueous suspensions of narrow size distribution colloidal particles plus dopant particles may achieve volume fractions solids in excess of approximately 50 percent by volume while maintaining a low, pourable viscosity. Practically, this means that the maximum total solids in a pourable suspension is typically in the vicinity of 55 to 60 volume percent. However, if the solids fraction in the matrix phase is somewhat reduced, a somewhat higher amount of dopant may be utilized.

It should be appreciated that the above discussion is not limited to ceramic-type materials, but is equally applicable to other types of materials as well, including metal powders.

EXAMPLES

Example I

Suspensions of alumina, silicon carbide whiskers, and yttria in water, having greater than 55 volume percent solids with a pourable rheology, were prepared in the following manner. 792 grams of dried alpha alumina particles, (AKP-15, Sumitomo Chemical Co. Ltd., Japan having a B.E.T. Specific Surface Area between 4 and 6 $m^2$/gram and a particle size between 0.4 and 0.6 micrometers) and 88 grams of yttrium oxide (YO-3-245 from Research Chemicals Co., Nacor Corp. P.O. Box 14588, Pheonix, AZ) were mixed together with 212 grams of water and 8 grams of Narlex LD-45 dispersant an acrylic acid-base polymeric polyelectrolyte having ammonium salt groups and available from (National Starch and Chemical Corp., Bridgewater, NJ) in a 1000 ml polypropylene screw top jar filled ½ with ½ inch spherical alumina grinding media. The mixture was shaken for 5 minutes on a Red Devil dual paint shaker. 179.3 grams of Tateho Silicon Carbide Whiskers (SCW-1 Tateho Chemical Industries Co. Ltd., Hyogoken, Japan) were then added in 50 gram aliquots, shaking the mixture for at least 5 minutes between aliquots. The resulting suspension had a consistency approximating that of mineral oil. It is believed that any commercial silicon carbide whisker may be acceptable to this process. Silicon nitride whiskers (SNW-1) from Tateho Chemical Industries, Company, Ltd. can be substituted as well as Arco silicon carbide whiskers (SC-9). SiAlON (Alcoa Corp.) has also been directly substituted in this formulation for alumina using 649 grams of SiAlON powder.

This process remedies the problems that are typically inherent in mixing high aspect ratio micron-sized whiskers and fibers with dispersed particles, namely, (i) non-uniform whisker distribution due to flow and wetting inhibiting typical of these high aspect, low bulk density materials and (ii) post-mixing segregation, where the whiskers tend to settle away from the fine particle dispersion.

Example II

A thoroughly dispersed suspension of alumina, silicon carbide particles, and water with greater than 55 vol. % solids and a pourable rheology was prepared in the following manner.

764 g of dried alumina particles (AKP-15) were mixed with 212 g water and 8 g LD-45 in a Red Devil dual paint shaker. 296 g of silicon carbide (UF-15 obtained from Lonza, Inc., Fairlawn, NJ) were added in 50 g aliquots, shaking the mixture for at least 5 minutes between aliquots. The resulting suspension had a viscosity of 196 cP at a shear rate of 99.8 sec$^{-1}$. This is a remarkable result in that the opposite interfacial properties of the two types of particles normally would cause agglomeration.

Example III

The following suspension was made in general accordance with the procedure of Example II: 750.2 g A-16 Superground alumina (Aluminum Co. of America, Pittsburgh, PA), 202.5 g water, and 7.5 g LD-45. After shaking, 568.4 g of HSY-3 partially stabilized zirconia (obtained from Zirconia Sales of America Inc., American Vermiculite Corp., Atlanta, GA) were added. The resulting suspension had a viscosity of 1068 cP at a shear rate of 98.8 sec$^{-1}$. Normally heterocoagulation would be a problem with these two types of particulates, and even zirconia, without the presence of alumina, tends to coagulate in the LD-[5 solution.

Example IV

The following suspension was made in general accordance with the procedure of Example II: 489 g SiAlON (from Aluminum Company of America, Pittsburgh, PA), 245 g water, and 5 g LD-45. After shaking, 280 g HSY-3 partially stabilized zirconia and 163 g Silicon Carbide whiskers (Tateho Chemical Industries Co., Ltd., Japan) were added in 50 g aliquots. The resulting suspension was a thin, pourable dilatent mixture having a consistency approximating that of corn syrup.

597 g AKP-20 alumina has been substituted for the SiAlON above. Further, yttria has been added as part of the above matrix phase at 10% of the matrix material.

Example V

The following suspension was made in general accordance with the procedure of Example II: 1051 g A-16 Superground Alumina, 370 g HSY-3 zirconia, 20 ml methanol, 13 ml dimethylsulfoxide, 7 ml ethylene glycol, 23 ml LD-45, and 206 ml water. The dispersion had a viscosity of 455 cP at 99.8 sec$^{-1}$. This example demonstrates that the liquid organic content may vary but still produce acceptable results.

Example VI

The following suspension was made in general accordance with the procedure of Example II: 102 g silicon carbide whiskers, 1050.7 g A-16 Superground Alumina, 20.3 ml methanol, 13.4 ml dimethylsulfoxide, 6.9 ml ethylene glycol, 23.7 ml LD-45, and 205.7 ml water.

The viscosity was 1010.4 cP at 99.9 sec$^{-1}$.

What is claimed is:

1. A process for the production of a densified article from a highly loaded, pourable composite suspension, the suspension provided by a process comprising:
   (a) mixing solid, essentially colloidal, narrow size range matrix particles selected from the group consisting of ceramics and metals with water and an acrylic acid-based polymeric electrolyte dispersant to provide a colloidal suspension; and
   (b) admixing solid dopant particles to the colloidal suspension of matrix particles to produce a high loaded pourable composite system, the dopant particles being geometrically and/or chemically diverse from the matrix particles, the total solids present in the system in an amount of at least 50% by volume.

2. The process defined by claim 1, wherein the matrix particles have an average size of not greater than one micron.

3. The process defined by claim 1, wherein the total solids are present in an amount of at least 55% by volume.

4. The process defined by claim 1, wherein the matrix particles and the dopant particles have opposite surface charges.

5. The process defined by claim 1, wherein the dopant further comprises fibers and/or whiskers.

6. The process defined by claim 4, wherein the dopant particles further include fibers and/or whiskers.

7. The process defined by claim 1, wherein the matrix material is selected from the group consisting of alumina, silicon carbide, partially stabilized zirconia, yttria, silicon nitride, magnesium oxide, boron carbide, boron nitride, aluminum nitride, borosilicate glass, cordierite, and mixtures thereof.

8. The process defined by claim 1, wherein step (a) includes admixing alumina particles.

9. The process defined by claim 1, wherein step (b) includes admixing zirconia particles.

10. The process defined by claim 1, wherein step (b) includes admixing yttria particles.

11. The process defined by claim 1, wherein step (b) includes admixing silicon carbide whiskers.

12. The process of claim 1, wherein step (b) includes admixing a dopant selected from the group consisting of: colloidal suspensions, fibers, whiskers, and mixtures thereof.

13. The process of claim 12, wherein step (b) includes admixing a colloidal suspension.

14. The process according to claim 12, wherein step (b) includes admixing a colloidal suspension comprising at least 20 percent volume solids.

15. The process of claim 13, wherein step (b) includes admixing a colloidal suspension having particles selected from the group consisting of: alumina, yttria, partially stabilized zirconia, silicon nitride, silicon nitride, and mixtures thereof.

16. The process of claim 12, wherein step (b) includes admixing at least 20 volume percent whiskers.

17. A process for the production of a dense composite article, comprising:

(a) mixing solids, essentially colloidal, narrow size range matrix particles selected from the group consisting of ceramics and metals with water and an acrylic acid-base polymeric polyelectrolyte dispersant to provide a colloidal suspension;
(b) admixing the colloidal suspension with dopant particles, chemically and/or geometrically diverse from the matrix particles, selected from the group consisting of essentially colloidal particles, fibers, whiskers, and mixtures thereof to produce a composite suspension, the total amount of matrix and dopant solids being at least 50 percent by volume, to provide a pourable composite suspension;
(c) forming the composite suspension into a desired shape;
(d) solidifying the shaped suspension to produce a solidified shape; and
(e) densifying the solidified shape to form a dense composite article.

18. The process defined by claim 17, wherein the matrix particles have an average size of not greater than one micron.

19. The process defined by claim 17, wherein the total solids are present in an amount of at least 55% by volume.

20. The process defined by claim 17, wherein the matrix particles and the dopant particles have opposite surface charges.

21. The process defined by claim 17, wherein the matrix particles are composed of a material selected from the group consisting of alumina, silicon carbide, partially stabilized zirconia, yttria, silicon nitride, magnesium oxide, boron carbide, boron nitride, aluminum nitride, borosilicate glass, cordierite, and mixture thereof.

22. The process defined by claim 17, wherein the dopant particles are composed of a material selected from the group consisting of alumina, zirconia, silicon carbide, yttria, silicon nitride, graphite, borosilicate glass, boron nitride, aluminum silicate, and mixtures thereof.

23. The process defined by claim 22, wherein the dopant is in the geometry of fibers and/or whiskers.

24. A highly loaded, pourable composite composition for the production of densified articles, comprising:
(a) solid, essentially colloidal, narrow size range matrix particles selected from the group consisting of sinterable ceramics and metals;
(b) water;
(c) an acrylic acid-based polymeric polyelectrolyte dispersant; and
(d) solid dopant particles chemically and/or geometrically diverse from the matrix particles; the total solids present in the composition in an amount of at least 50% by volume, the suspension having a low, pourable viscosity.

25. The composition defined by claim 24, wherein the total solids comprise at least 55% by volume of the composition.

26. The composition defined by claim 24, wherein the dopant particles comprise at least 20% by volume of the composition.

* * * * *